Oct. 16, 1956 A. C. WILLARDSEN 2,766,548
FLOATING SINKER
Filed Oct. 6, 1953
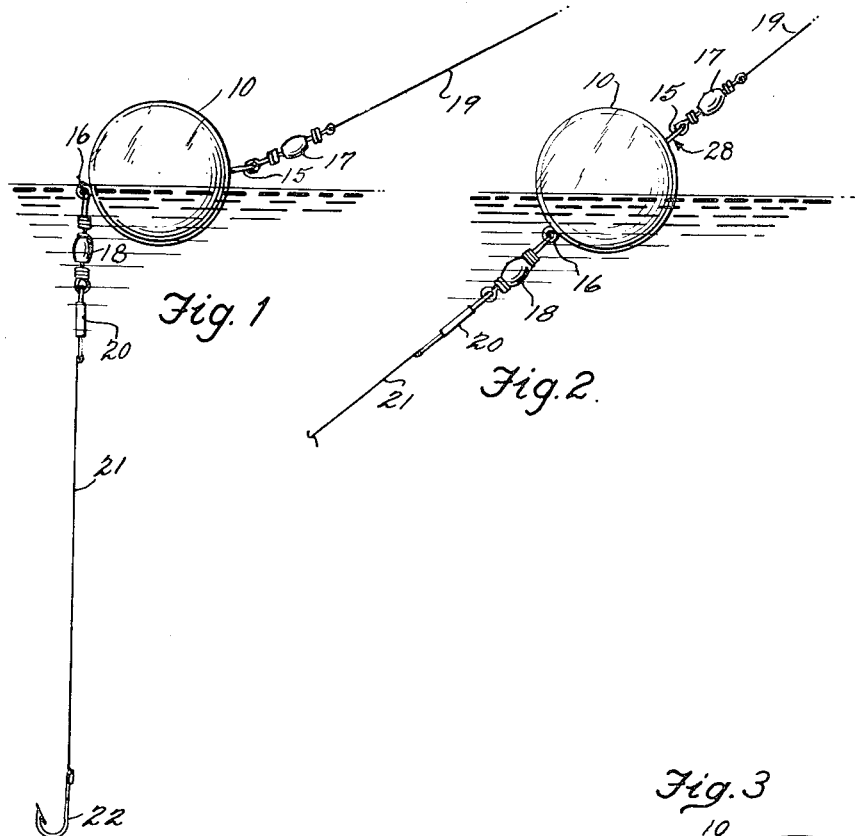
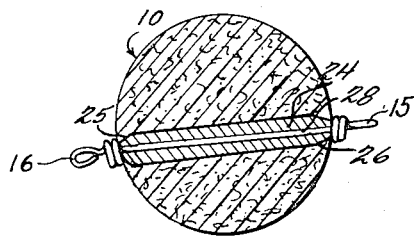
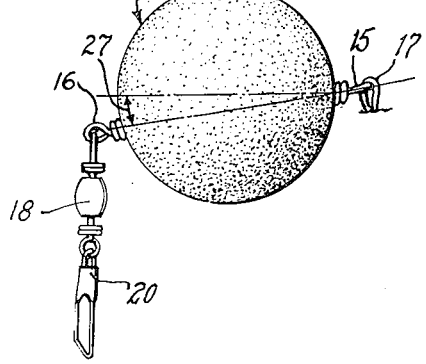
INVENTOR
ANTHONY C. WILLARDSEN
BY
*Semmes & Semmes*
ATTORNEYS United States Patent Office 2,766,548
Patented Oct. 16, 1956

2,766,548

FLOATING SINKER

Anthony C. Willardsen, Salt Lake City, Utah

Application October 6, 1953, Serial No. 384,425

3 Claims. (Cl. 43—43.13)

The present invention relates broadly to fishing equipment and more particularly to a floating sinker adapted for use with spinning fishing equipment.

Heretofore many types of floats and sinkers have been utilized in connection with fishing equipment, the use of which is well known. It has been found however, that the known equipment is not entirely satisfactory for use in connection with spinning reels and the like which are now being used extensively in connection with various types of casting rods and particularly spinning rods.

Spinning reels are different from the normal casting reels in that the line comes off the spool of the reel without any turning mechanism within the reel. Due to this, possibilities of back lash and back casts gone astray are eliminated. This has resulted in increased usage of spinning gear.

When using a spinning reel there is, however, a drawback in that as each loop of line comes off the spool it puts a twist into the line. Accordingly, when the line is again wound on the spool for recasting, if the preceding twist has not been removed then the line is further twisted. This results in the line becoming so twisted that it is unmanageable after extensive use.

It is accordingly the primary object of the present invention to facilitate untwisting of the line when it is being rewound on the spool whereby excessive twisting, so as to make the line unmanageable, is eliminated.

Heretofore, in order to prevent a twisting of the line, a swivel has been used near the end of the line. In theory the line will untwist down to the swivel and leave a lure, fastened beyond the swivel, unaffected by twisting motion of the line. This has not been the case, however, since the swivel is inherently an inefficient device and has a tendency to turn in the water. This results in the lures on the end of the line being commensurately turned in the water and thereby detracting from their effectiveness.

The floating sinker of the present invention overcomes the principal drawback of the spinning reel, as also the drawback of the heretofore used swivel gear. The floating sinker of the present invention is designed to be attached near the end of the line and used in connection with a standard swivel.

A further object of the present invention is to provide a floating sinker which has sufficient weight so as to aid in casting and permit longer casts.

Another object of the present invention is to provide a floating sinker wherein the buoyancy will maintain the sinker in floating condition but to a slight degree only.

A still further object of the present invention is to provide in a floating sinker, an off balance construction wherein, figured from the center line of the sinker, the weight is off center to one side of the center line. With such a construction, gravity will prevent the float from turning with movement through the water and with twisting motion of the line. Thereby the lure will remain relatively stable and yet the twisted line can untwist itself during rewinding.

An additional object of the present invention is to provide a floating sinker constructed of standard parts and which can be adapted to the particular use of the present invention. In the invention a cork float is utilized which has a metal sinker inserted therethrough, and which is offset from the center line of the cork ball. The size of the cork and the size of the sinker can be related to one another so that the floating sinker will float but have only a slight degree of buoyancy.

Other objects and advantages of the present invention will be readily apparent from the following detailed description of embodiments thereof, taken together with the accompanying drawings, in which:

Fig. 1 is a view of the floating sinker of the present invention, having attached thereto a leader and hook at one side and at the other side the fishing line;

Fig. 2 is a partial view similar to Fig. 1 showing the position of the individual elements when the line is being rewound or when a fish has been caught on the hook;

Fig. 3 is a partial enlarged view showing in detail a cork float and an off center sinker therethrough; and Fig. 4 is a sectional view taken diametrically through the embodiment of Fig. 3.

In the drawings, like references refer to like parts, and the following detailed description is to be taken in the light thereof.

In Fig. 1 of the drawings, the floating sinker 10 consists of a cork ball or sphere having a shank 23 passing therethrough and which terminates in eyelets 15 and 16 which are fixed with respect to the floating sinker 10. In the embodiment shown in the drawings, there is a swivel 17 secured in the eyelet 15, and a second swivel 18 secured in the eyelet 16. The line 19 from the reel is secured to the upper end of swivel 17. At the opposite end of the floating sinker 10 and secured to the free end of the swivel 18 is, in the embodiment shown, a snap swivel 20 to which is secured the leader 21, having a hook 22 thereon. Manifestly, any type of lure could be used in place of the hook 22 such as is normal when casting, but a hook has been shown for simplicity.

It is to be understood that the swivel 18 can be eliminated in its entirety, and only a single swivel 17 used at one end of the float, for securing to the line 19. This position of the swivel 17 between the floating sinker and the line 19 is the important one and, as will be shown hereinafter, permits the line 19 to untwist, while at the same time the floating sinker will remain substantially in the same position so that the lure attached to the leader 21 will remain substantially in the same position in the water and will not turn with the line.

As more clearly shown in Figs. 3 and 4, the floating sinker generally designated 10 consists of a cork ball or sphere which can be purchased and used in varying sizes. These standard cork balls normally have a hole through the center thereof. In order to give the off center effect to this embodiment of the invention, an elongated straight lead sinker or the like, 24 is inserted through the cork ball in an off center position, that is, not along a diametrical axis of the sphere. This can be effected, as shown, by having one end of the lead sinker shown at 26 located substantially at one end of the hole through the cork ball 10. The opposite end of the sinker, however, designated at 25 is not on a diametrical axis of the sphere but offset by an angle indicated at 27, with particular reference to Fig. 4. The arrangement accordingly is such that the sinker 24 extends completely through the cork ball 10 and is displaced from the center of the sphere at an acute angle to a diametrical axis of the sphere passing through one end of the sinker. The hole normally passing through the cork sphere can be otherwise sealed by any desired means such for example as wax, or a cork insert, and the like.

Since the lead sinker 24 has been so inserted off center in the cork ball 10, the unit, when in the water, will be prevented from turning by means of gravity due to the weight of the sinker inserted off center.

For attaching to the line and to the leader, the shank 28 is inserted through the lead sinker, although any other desired means of securing can be utilized. The shank 28 has the eyelets 15 and 16 formed at the ends thereof. A swivel 17 is secured to eyelet 15 and a swivel 18 is secured to the eyelet 16 as above described, although it is to be understood that only one swivel is necessary and that one being at the end to which the line attaches. The snap swivel 20 can be incorporated in or secured to the swivel 18, and if desired to the swivel 17 to fit the individual needs of the angler or caster.

Manifestly materials other than cork can be utilized for the main body of the floating sinker and any materials which are suitable could be utilized for providing the off balance weight in the device. The essence of the present invention resides in that the floating sinker which is designed to be attached near the end of the line, and used in connection with a standard swivel, provides sufficient weight so that it is an aid in proper casting of the lure; and sufficient buoyancy is provided so that the floating sinker will float when on the water and yet only a slight degree of buoyancy is obtained so that the lure can be maintained at a desired and proper depth in the water. The weight can be varied as desired, by changing the relative sizes and/or materials of the float and the sinker for example. The offset weight provides for an off-balance so that the floating sinker will not turn in the water with the untwisting of the line and thereby deter the turning of the lure. This also serves, in effect, to increase the efficiency of the standard swivel used.

Manifestly, minor changes may be made in the form and construction of the invention without departing from the material spirit thereof. The present invention is not to be confined to the exact form herein shown and described, but is to include all such modifications and changes as properly come within the scope as defined in the appended claims.

I claim:

1. A floating sinker comprising a sphere, an elongated straight weight in said sphere extending completely therethrough and being displaced from the center of the sphere and at an acute angle to a diametrical axis of the sphere passing through one end of said weight and constituting offset weight means for positioning of said sphere in water, attachment means comprising a shank extending through and embedded in said weight in alignment therewith, and eyelets on the exposed ends of said shank.

2. A floating sinker as claimed in claim 1, a swivel secured to at least one said eyelet and adapted for securing a fishing line thereto, the other of said eyelets being adapted for securing to a leader having a lure thereon, said floating sinker with said offset weight being adapted to permit untwisting of a fishing line while preventing turning of a lure.

3. A floating sinker consisting of a cork sphere, having a straight bore extending therethrough, said bore being offset from the center of the sphere and angularly disposed to a diametric axis of the sphere passing through one end of said bore, a metal sinker disposed within said bore, a wire shank embedded in said metal sinker in alignment therewith, the ends of said shank extending externally of the sphere and being provided with eyelets, and a swivel attached to at least one of said eyelets.

References Cited in the file of this patent

UNITED STATES PATENTS

| | | |
|---|---|---|
| 786,597 | Picken | Apr. 4, 1905 |
| 1,522,450 | Hayes | Jan. 6, 1925 |
| 1,546,701 | Bailer | July 21, 1925 |
| 2,022,602 | Mortensen | Nov. 26, 1935 |
| 2,437,549 | Pecher | Mar. 9, 1948 |
| 2,491,182 | Jaske | Dec. 13, 1949 |

FOREIGN PATENTS

| | | |
|---|---|---|
| 131,188 | Sweden | Mar. 20, 1951 |
| 955,494 | France | June 27, 1949 |